US008236448B2

(12) United States Patent
Okuno et al.

(10) Patent No.: US 8,236,448 B2
(45) Date of Patent: Aug. 7, 2012

(54) BATTERY ELECTRODE SUBSTRATE, AND ELECTRODE EMPLOYING THE SAME

(75) Inventors: Kazuki Okuno, Itami (JP); Jin-Joo Park, Itami (JP); Masahiro Kato, Itami (JP); Masaru Yao, Ikeda (JP); Tsutomu Iwaki, Ikeda (JP); Tetsuo Sakai, Ikeda (JP)

(73) Assignees: Sumitomo Electric Industries, Ltd., Osaka (JP); National Institute of Advanced Industrial Science and Technology, Tokyo (JP)

( * ) Notice: Subject to any disclaimer, the term of this patent is extended or adjusted under 35 U.S.C. 154(b) by 2 days.

(21) Appl. No.: 12/957,058

(22) Filed: Nov. 30, 2010

(65) Prior Publication Data

US 2011/0070362 A1 Mar. 24, 2011

Related U.S. Application Data

(63) Continuation of application No. 11/898,954, filed on Sep. 18, 2007.

(30) Foreign Application Priority Data

Sep. 22, 2006 (JP) ................................. 2006-257612

(51) Int. Cl.
*H01M 4/00* (2006.01)
*H01M 4/13* (2010.01)
*B05D 5/12* (2006.01)
(52) U.S. Cl. ........................ 429/223; 429/236; 427/123
(58) Field of Classification Search ........ 29/2; 428/377, 428/379; 429/236, 223; 427/123
See application file for complete search history.

(56) References Cited

U.S. PATENT DOCUMENTS

| | | | | |
|---|---|---|---|---|
| 3,907,604 A | * | 9/1975 | Prentice | 429/254 |
| 2006/0159998 A1 | * | 7/2006 | Harada et al. | 429/236 |

FOREIGN PATENT DOCUMENTS

| | | | |
|---|---|---|---|
| CN | 1805189 A | | 7/2006 |
| JP | 08250125 A | * | 9/1996 |
| JP | 09-306484 | | 11/1997 |
| JP | 2004-193062 A | | 7/2004 |
| JP | 2005-347177 | | 12/2005 |
| JP | 2006-073463 | | 3/2006 |

OTHER PUBLICATIONS

Japanese Notice of Grounds of Rejection, w/ English translation thereof, issued in Japanese Patent Application No. JP 2006-257612 dated Mar. 19, 2009.
Japanese Notice of Grounds of Rejection, w/ English translation thereof, issued in Japanese Patent Application No. JP 2006-257612 dated Jul. 2, 2009.
Chinese Office Action issued in Chinese Patent Application No. CN 200710161814.3 dated Jun. 30, 2010.

* cited by examiner

*Primary Examiner* — Jennifer Michener
*Assistant Examiner* — Eli Mekhlin
(74) *Attorney, Agent, or Firm* — McDermott Will & Emery LLP

(57) ABSTRACT

An electrode substrate for a battery has nickel applied as a coat on the surface of a base constituted of crossing of a plurality of fibers including a core formed of synthetic resin and a coating of synthetic resin having a softening temperature lower than the softening temperature of the synthetic resin forming the core. The electrode substrate has the fibers of the base fusion-bonded at a cross point by heat treatment. The ratio of the coating occupying a II-II cross section of the fiber cross point is larger than the ratio of the coating occupying a fiber cross section (III-III cross section) at a site other than at the cross point.

5 Claims, 1 Drawing Sheet

BATTERY ELECTRODE SUBSTRATE, AND ELECTRODE EMPLOYING THE SAME

RELATED APPLICATIONS

This application is a Continuation of U.S. patent application Ser. No. 11/898,954, filed on Sep. 18, 2007, claiming priority of Japanese Patent Application No. 2006-257612, filed on Sep. 22, 2006, the entire contents of each of which are hereby incorporated by reference.

BACKGROUND OF THE INVENTION

1. Field of the Invention

The present invention relates to an electrode substrate for a battery, and an electrode for a battery. Particularly, the present invention relates to an electrode substrate and an electrode for a battery, having high capacity maintaining rate and superior in high rate discharge property.

2. Description of Related Art

Conventionally, alkaline secondary batteries as well as lead storage batteries and lithium ion batteries achieve widespread use as secondary batteries for portable applications, mobile usage, industrial usage, and the like.

The alkaline secondary battery is used in various fields by virtue of its high reliability, long lifetime, and its advantage over the lithium ion battery in terms of reducing the cost, size, and weight. Particularly, from the standpoint of saving energy and promoting environmental conservation, automobile manufacturers are now adapting alkaline secondary batteries to practical use for hybrid vehicles and the like, attracting widespread attention even abroad. At present, a nickel-hydrogen battery is the mainstream of the power source.

For alkaline batteries employed as the power source of various devices in applications ranging from portable equipment to large facilities for industrial use, a nickel electrode is often employed as the positive electrode, i.e. the cathode. Similar to electrodes of other batteries, the nickel electrode employs a structure in which the current collector functioning to collect current carries the active cathode material for the positive electrode to induce battery reaction. In this connection, the invention of a sintered nickel plate having nickel powder sintered instead of the conventional pocket type played a major role in the development of alkaline secondary batteries for practical use.

From then on, there have been intensive efforts to reduce the cost and increase the capacity of the nickel electrode. In connection with reducing the cost, there has been proposed a two dimensional structure such as of punched metal instead of the sintered compact having a three dimensional mesh structure. Specifically, this technique is directed to producing a nickel electrode by filling the pores of the punched metal with active material paste (paste mixture including active material). However, such a nickel electrode has not yet arrived at the stage of practical use due to various problems thereof.

Increasing the capacity of the nickel electrode has become possible by employing nickel foam of a three dimensional mesh structure instead of a sintered compact. Nickel foam is generally produced by a method including the steps of applying nickel plating on a foam sheet of urethane resin, burning urethane resin, and then effecting annealing under reducing atmosphere to improve the strength of the nickel frame. Further, the pores of the nickel foam are filled with active material paste, and then subjected to pressurization. Thus, a nickel electrode is obtained. The porosity of the nickel foam (the ratio of the pores to the volume of the whole) is 92% to 96%, which is extremely high as compared to approximately 80% for a sintered compact. Since the amount of active material filled per unit volume is increased, higher capacity can be realized.

At the initial stage of development, nickel foam had the problem that it was readily damaged. For example, when a nickel electrode in sheet form was rolled up and stored in a cylindrical battery container, cracks appeared in the nickel foam. Such a problem, however, has been overcome, and a cylindrical or rectangular solid nickel-hydrogen battery employing a nickel foam current collector has been put into practical usage for portable equipment as well as for hybrid vehicles demanding high power and high reliability. Although some devices employ a nickel-hydrogen battery with a sintered compact as the nickel electrode, the mainstream has changed to an electrode having the nickel foam current collector filled with active material paste (active material mixture), such as the nickel electrode plate disclosed in Japanese Patent Laying-Open No. 09-306484, for example.

Nickel foam has now arrived at a level suitable in property from the standpoint of high power, not to say high capacity, for a current collector of an electrode destined for batteries. The remaining issue is to render the nickel electrode inexpensive by reducing the amount of nickel that corresponds to most of the cost of the nickel electrode.

At the early stage of development, the mass per unit area of nickel for nickel foam applied to a battery electrode was 500 $g/m^2$ to 600 $g/m^2$. There has now been developed nickel foam applicable to practical usage even if the mass per unit area is approximately 350 $g/m^2$. However, the strength of the nickel electrode will be degraded if the amount of nickel is further reduced. Even if nickel foam can be produced, the possibility of fracture during the fabrication step of the nickel electrode or during production of the battery is extremely high.

There has been proposed a nickel electrode employing a porous electrode substrate formed by plating the surface of a nonwoven fabric core with nickel as the current collector instead of nickel foam. This nickel electrode with a nonwoven fabric as the core can have the amount of nickel reduced while maintaining a predetermined strength, as compared to the nickel foam disclosed in the aforementioned Japanese Patent Laying-Open No. 09-306484, and is advantageous in that fabrication is facilitated. An electrode formed having such an electrode substrate filled with an active material is disclosed in, for example, Japanese Patent Laying-Open No. 2005-347177.

This publication discloses a nickel electrode destined for an alkaline battery, obtained by having the surface of a nonwoven fabric made of resin plated with nickel to form a current collector (porous electrode substrate), filling the current collector with active material mixture, followed by pressure forming.

However, the battery such as of the type disclosed in the aforementioned Japanese Patent Laying-Open No. 2005-347177 is disadvantageous in that the battery performance is readily degraded in accordance with the repetitive charging and discharging.

This arises from the fact that, in the case where the level of the pressure, when applied to the electrode substrate filled with active material mixture is high, the fiber cross point of the nonwoven fabric qualified as the core is displaced after compression. If the fiber cross point is modified between the state prior to compression and after compression as in this case, the three dimensional mesh structure of the electrode substrate will fracture to cause a crack in the nickel coated on the surface of the fiber and/or constriction of the pore in the electrode substrate, leading to degradation of the battery performance.

Although the aforementioned Japanese Patent Laying-Open No. 2005-347177 teaches that the fibers of the non-woven fabric qualified as the core is fusion-bonded at the cross point by heat treatment, it is silent about a specific definition of the degree of fusion-bonding. There is a possibility of the bonding of the fibers being broken in the compression stage of the electrode substrate to result in damage of the three dimensional mesh structure of the electrode substrate. Furthermore, it is known that the electrode bulges in accordance with the charging and discharging of the battery. There is a possibility of the three dimensional mesh structure of the electrode substrate being damaged by this bulging of the electrode.

SUMMARY OF THE INVENTION

In view of the foregoing, an object of the present invention is to provide an electrode substrate and an electrode for a battery, having a capacity less likely to be reduced even by repetitive charging and discharging.

This object is achieved by fusion-bonding the fibers constituting an electrode substrate at a cross point through heat treatment to attain a specific degree of fusion-bonding. The present invention is directed to an electrode substrate for a battery, having nickel applied as a coat on the surface of a base constituted of crossing of a plurality of fibers including a core formed of synthetic resin and a coating of synthetic resin having a softening temperature lower than the softening temperature of the synthetic resin forming the core.

The fibers are fusion-bonded at a cross point by heat treatment.

In the electrode substrate for a battery, the average value of the ratio of the coating occupying a cross section (a) at n cross points of fibers selected arbitrarily and the average value of the ratio of the coating occupying a cross section (b) of m fibers at a site other than at the cross points selected arbitrarily satisfies the equation set forth below.

$$\left[\sum_{i=1}^{n}(Ac/A)\right]\Big/n > \left[\sum_{j=1}^{m}(Bc/B)\right]\Big/m$$

where n, m: natural number to obtain the average value of the ratio of the coating occupying the cross section, $n \geq 3$, $m \geq 3$, i, j: natural number, $i \geq 1$, $j \geq 1$, A: cross sectional area of cross section (a) at cross point, Ac: cross sectional area of coating at cross section (a), B: cross sectional area of cross section (b) of fiber other than at cross points, Bc: cross sectional area of coating at cross section (b), and cross section (a) at the cross point is the cross section bisecting the larger angle of angles at the cross point defined by fibers.

Preferably, the pore size in the electrode substrate for a battery is 20 μm-50 μm.

Preferably, the core is formed of polypropylene, and the coating is formed of polyethylene. More preferably, the ratio of the mass of polypropylene to the mass of polyethylene is not more than 7/3.

Preferably, the amount of nickel applied as a coat on the surface of the base is 150 g/m$^2$-300 g/m$^2$.

The present invention also relates to an electrode for a battery, having the electrode substrate set forth above carrying an active material mixture containing nickel hydroxide.

Furthermore, the present invention relates to an alkaline battery employing the electrode for a battery set forth above.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
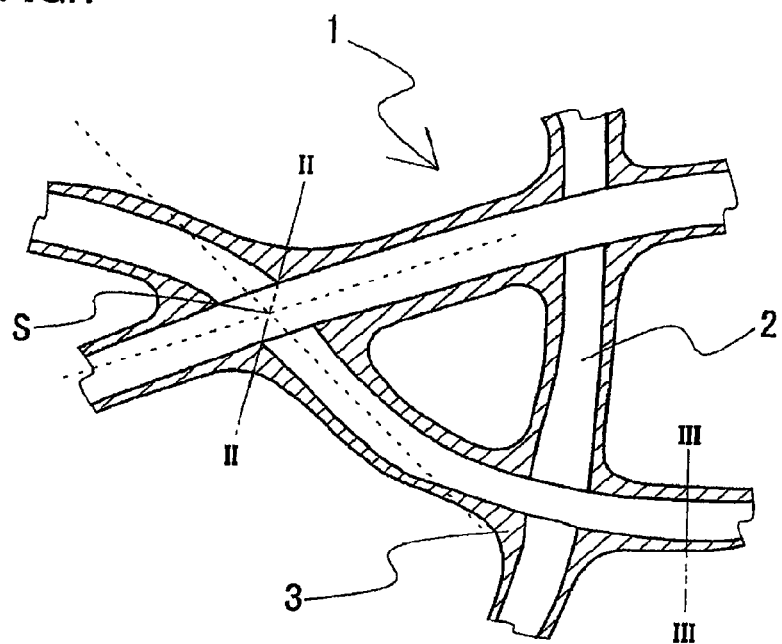
FIG. 1 is an enlarged view of a base of an electrode substrate of the present invention.

The present invention is directed to an electrode substrate for a battery, having nickel applied as a coating on the surface of a base constituted of crossing of a plurality of fibers including a core formed of synthetic resin and a coating formed of synthetic resin having a softening temperature lower than that of the synthetic resin forming the core. In the electrode substrate of the present invention, fibers constituting the electrode substrate are fusion-bonded at cross points by heat treatment.

In the present invention, "cross point" refers to the point where two or more fibers cross over each other, qualified as a contact point of the fibers, and in terms of mathematics, implies a point of intersection by lines corresponding to fibers.

The electrode substrate for a battery of the present invention is based on the premise that the electrode substrate is compressed after being filled with an active material. As mentioned before, the three dimensional mesh structure of the electrode substrate is readily damaged in compression. In view of this issue, the base formed of a plurality of crossing fibers constituting the electrode substrate of the present invention is subjected to heat treatment to have fibers fusion-bonded at the cross points, and the degree of fusion-bonding of the fiber crossing is defined.

Specifically, in connection with the fiber cross points of the base, the average value of the ratio of the coating occupying a cross section (a) at n cross points of fibers selected arbitrarily, and the average value of the ratio of the coating occupying a cross section (b) of m fibers at a site other than at the cross points selected arbitrarily satisfy the following equation.

$$\left[\sum_{i=1}^{n}(Ac/A)\right]\Big/n > \left[\sum_{j=1}^{m}(Bc/B)\right]\Big/m$$

where n, m: natural number to obtain the average value of the ratio of the coating occupying the cross section, $n \geq 3$, $m \geq 3$, i, j: natural number, $i \geq 1$, $j \geq 1$, A: cross sectional area of cross section (a) at cross point, Ac: cross sectional area of coating at cross section (a), B: cross sectional area of cross section (b) of fiber other than at cross points, Bc: cross sectional area of coating at cross section (b), and cross section (a) at the cross point is the cross section bisecting the larger angle of angles at the cross point defined by fibers. In the present invention, the straight lines defining the angle determining the fiber cross point is defined by the gradient of the center of the core passing through a cross point S, when viewed in two-dimensional perspective.

In the electrode substrate satisfying the equation set forth above, the ratio of the coating occupying cross section (a) at the cross point of fibers constituting the electrode substrate is larger than the ratio of the coating occupying fiber cross section (b) other than at the cross points. In other words, the cross sectional area at a cross point corresponding to the fusion-bonding of two fibers is larger than the cross sectional area of just two fibers together. Therefore, in the electrode substrate for a battery of the present invention, the fibers of the substrate corresponding to the core of the electrode substrate are bonded with each other extremely firmly. The three dimensional mesh structure can be maintained even if a compressive force of a level that will disrupt the bonding at the fiber cross point in a conventional electrode substrate is applied. In other words, various disadvantages caused by the fracture of the three dimensional mesh structure can be prevented to suppress degradation in the battery capacity.

The ratio of the coating occupying cross section (a) of the fiber cross point can be made larger than the ratio of the coating occupying fiber cross section (b) at a section other than at the cross point by virtue of the fiber coating being softened by the heat treatment. When the base is subjected to heat treatment, the softened fiber coatings fuse together. By adjusting the heat processing condition (temperature and time) at this stage, the frame configuration of the base can be maintained by the fiber core while allowing gathering, at the cross point region, of the softened coating in the proximity of the cross point. As a result, the ratio of the coating at the cross point can be increased.

The cross points selected arbitrarily in the equation set forth above correspond to a cross point where two fibers cross. This is because the equation set forth above is aimed to identify whether the electrode substrate has the minimum level of strength required to withstand the filling pressure of the active material mixture. It is expected that a cross point where three or more fibers cross each other and are fusion-bonded exhibit a stronger binding than that at the cross point where two fibers cross each other and are fusion-bonded.

Figure 2:
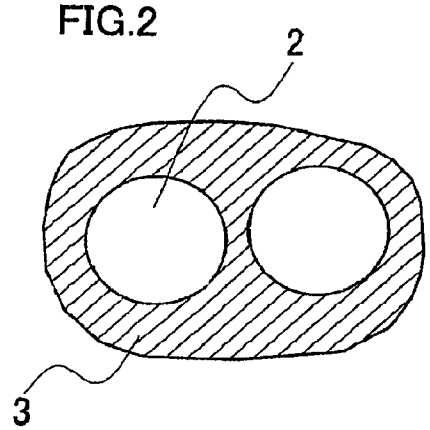
FIG. 2 is a sectional view of the base of the electrode substrate taken along line II-II of FIG. 1.

Cross section (a) at the cross point shown in FIG. 2 is the cross section bisecting the larger angle of angles at the cross point defined by fibers determining fiber cross point S of FIG. 1, corresponding to an example that will be described afterwards (II-II cross section). This cross section (a) is likely to have the smallest cross sectional area among cross sections through the cross point cut at various angles. This means that the equation set forth above defines the degree of fusion-bonding at the region most likely to be of low strength among the fiber cross points of the substrate.

In the equation, n and m are natural numbers selected arbitrarily to obtain the average value of the ratio of the coating occupying the cross section. The values of n and m are natural numbers selected independently, and are at least 3, preferably at least 10. The upper limit of n and m are not particularly defined. By taking a large number for n and m to increase the population for obtaining the average, the ratio of the coating occupying the cross section is more likely to reflect the entirety of the electrode substrate, so that an electrode substrate having stable performance can be achieved. Relevant cross sections (a) and (b) to obtain the average may be selected from the same or different field of view through the microscope. In particular, an electrode substrate of higher reliability can be achieved in the case where these cross sections are selected from a different field of view.

If the ratio of the coating at the cross point is too high, the pore may be constricted. It is therefore preferable to set the upper limit for the ratio of the coating at the cross point. Specifically, the ratio of the coating at a cross point may be defined as by the equation set forth below.

$$k \times \left[ \sum_{j=1}^{m} (Bc/B) \right] \Big/ m > \left[ \sum_{i=1}^{n} (Ac/A) \right] \Big/ n$$

$$k \le 2.0$$

When the ratio of the coating at the fiber cross point is not more than 2.0 times the ratio of the coating of a fiber located at a site other than the cross section, i.e. k<2.0, the pores in the substrate will not be constricted and the fibers will not be rendered too thin at sites other than at the cross point.

Preferable embodiments of respective elements of the electrode substrate for a battery of the present invention will be described hereinafter.

In the electrode substrate of the present invention, the pore size of the base can be made smaller since fibers of the base are fusion-bonded firmly at the cross point. Specifically, the pore size can be set to 20 μm-50 μm, smaller than the pore size of a conventional electrode substrate. It is to be noted that filling the pores with active material mixture will become difficult by the smaller pore size of 20 μm-50 μm. For example, Japanese Patent Laying-Open No. 09-306484 teaches that filling the pore of the electrode substrate with active material is rendered difficult when the pore size is 150 μm or below. Although increasing the filling pressure of the active material mixture is cited as one method of improving the filling capability of the active material mixture, there is a possibility of the mesh structure of the electrode substrate being damaged, depending upon the level of the filling pressure. The electrode substrate for a battery of the present invention is advantageous in that the mesh structure is not readily damaged even if a high filling pressure for the active material mixture is applied since fibers constituting the core are firmly fusion-bonded at the cross points.

By reducing the pore size as set forth above, the distance between the active material in the pore and the electrode substrate becomes shorter. Therefore, the conductivity in the electrode is improved to allow a battery superior in high rate discharge property. Further, reducing the pore size allows bulging of the active material to be suppressed. Therefore, degradation in the battery performance caused by charging and discharging of the battery can be suppressed. Such a battery having a long lifetime and superior in high rate discharge property is conveniently adaptable for use in hybrid vehicles and the like with increasing demand. From the standpoint of superior strength of the substrate and high rate discharge property, the pore size of the electrode substrate is more preferably 20 μm to 40 μm. In the present invention, "pore size" is the value where the accumulated pore distribution is 30%, measured by the bubble point test.

In order to achieve an electrode substrate with the pore size set forth above, the fiber constituting the base set forth below, particularly fiber of low fineness is to be used. For example, the fineness, when one type of fiber is employed, is preferably not more than 7 dtex, more preferably at least 2.2 dtex and not more than 4 dtex. In the case where mixed threads are employed for the fiber, a fiber of at least 4 dtex and not more than 7 dtex, and a fiber of at least 2.2 dtex and not more than 4 dtex are preferably employed for the mixed thread. The pore size can be made small by taking the fineness set forth above. Further, the pore size can be reduced by increasing the mass per unit area of the fiber. The mass per unit area of the fiber is at least 30 g/m² and not more than 70 g/m², more preferably at least 30 g/m² and not more than 60 g/m².

The base employed in the electrode substrate of the present invention has a three dimensional mesh structure formed of fibers. The fabric of the base may be woven or not woven.

The fiber of the present invention takes the sheath-core structure including a core and a coating. The synthetic resin forming the core and the coating of the fiber corresponds to a material that allows fusion-bonding of the fibers at the cross point by heat treatment. For example, polyolefin resin such as polyethylene (PE), polypropylene (PP), polypropylene copolymer (PPCO) and the like is conveniently adaptable. Polyolefin resin is superior in alkaline resistance and oxidation resistance, and less vulnerable to age deterioration. For the synthetic resin forming the core of the fiber, polypropylene (PP), for example, is conveniently adaptable. Polyolefin resin is also preferable as the synthetic resin forming the coating. For example, when the synthetic resin forming the core is polypropylene, polyethylene having a softening temperature lower than that of polypropylene is conveniently adaptable for the synthetic resin forming the coating.

According to the base constituted of a fiber of a sheath-core structure including a coating of synthetic resin having a softening temperature lower than that of the synthetic resin forming the core in the present invention, the synthetic resin constituting the core corresponds to the frame maintaining the three dimensional mesh structure of the electrode substrate, and only the coating is softened to allow fusion-bonding at the cross point. By employing the heat treatment conditions of allowing softening of only the synthetic resin forming the coating and not softening the synthetic resin forming the core corresponding to the frame of the base, the mesh structure per se will not be deformed. Therefore, the base formed of the fiber of the sheath-core structure set forth above will not have the pore size reduced by the heat treatment or have a constricted portion, avoiding degradation of the filling property of the active material. For example, the heat treatment to cause fusion-bonding at the cross points of fibers employing polypropylene and polyethylene for the synthetic resin forming the core and the coating, respectively, is preferably carried out under the conditions of approximately 5 seconds to 3 minutes at 95° C. to 140° C., more preferably 5 seconds to 20 seconds at 100° C. to 140° C.

For the fiber having the sheath-core structure set forth above in the present invention, the mass ratio of the synthetic resin forming the core to the synthetic resin forming the coating is preferably not more than 7/3. If this mass ratio of the synthetic resin forming the core to the synthetic resin forming the coating exceeds 7/3, the amount of synthetic resin forming the coating effective for fusion-bonding between fibers is so low that the thickness of the fiber cross point and the strength of the electrode substrate are not sufficient. In contrast, if this mass ratio is too low, most of the fiber will be rendered soft in the heat treatment, leading to the possibility of the three dimensional mesh structure of the base being fractured. Therefore, the favorable mass ratio of the synthetic resin forming the core to the synthetic resin forming the coating is at least 2/8.

The base porosity (the ratio of the pores to the volume of the whole) is preferably 85% to 98%. A higher porosity allows more active material to be carried by the electrode substrate. However, the strength of the electrode substrate will be degraded to readily cause damage if the porosity is too high. Therefore, the porosity of the base is more preferably 90% to 96%. The porosity set forth above will exhibit little or no change even if the surface of the base is plated with nickel since the thickness of the nickel is extremely small.

In the heat treatment of the base, entangling is preferably carried out to increase the fusion-bonding regions between fibers. This entangling is the treatment of entangling the fibers of the base together by physical impact such as by jet stream, needle punching, or the like. By this entangling treatment, the cross points between fibers can be increased. Since the fusion-bonding region of the fibers can be increased by carrying out heat treatment subsequent to entangling, the strength of the electrode substrate can be improved. Additionally, hydrophilization treatment can be performed to improve the adherence between the fiber and nickel.

The amount of nickel applied as a coating on the surface of the base corresponds to an amount allowing the electrode substrate to exhibit sufficient performance as a current collector. Preferably, the amount of nickel applied as a coating is 150 g/m² to 300 g/m². This amount is lower than 350 g/m², which is the mass per unit area of the nickel foam employed for practical use. Therefore the fabrication cost of an electrode substrate can be reduced.

If the amount of nickel is less than 150 g/m², the strength of the electrode substrate will be insufficient, leading to the possibility of generating a crack in the nickel coat layer at the time of filling the active material mixture. Further, this amount of nickel is so low that the electrical resistance of the electrode substrate is increased to degrade the performance as a current collector. In contrast, if the amount of nickel exceeds 300 g/m², the cost cannot be reduced. Further, the nickel layer coating will become slightly thicker. If a small pore size is selected for the electrode substrate of the present invention, for example 20 μm to 50 μm, the pore size will be further reduced by the nickel layer coating, rendering filling of the active material mixture difficult. Although this can be accommodated by slightly increasing the pore size of the electrode substrate such that the pore size is 20 μm to 50 μm subsequent to nickel plating, increase in cost cannot be avoided. Thus, the nickel amount is suitably not more than 300 g/m².

A well-known favorable method is to be selected for the method of coating the base with nickel. For example, electroless plating, electrolytic plating, chemical vapor deposition such as by sputtering, and the like can be cited for the method of coating the base with nickel. Further, the base can be coated with nickel based on the combination of the aforementioned methods. Preferably, the surface of the base is rendered conductive by electroless plating or sputtering, and then electrolytic plating is performed. Electrolytic plating is carried out using a plating bath. A Watt bath, chloride bath, sulfamine acid bath, and the like are conveniently adaptable. An additive such as pH buffer, surface buffer, or the like may be added.

In order to produce an electrode for a battery employing the electrode substrate set forth above, active material mixture is to be introduced into the electrode substrate. By drying the electrode substrate filled with an active material mixture, the electrode substrate can be made to carry an active material mixture.

For the active material mixture to be filled in the electrode substrate of, for example, a nickel-hydrogen battery, nickel hydroxide is taken as the main component. In addition, preferably a conductivity-assist agent to aid the conductivity of nickel hydroxide, a binder to improve the adherence between the current collector and the active material, or the like is included. As used herein, "main component" corresponds to a component of at least 50 mass % after drying, preferably 80 mass % to 95 mass after drying, to the total active material mixture filled in the electrode substrate. If nickel hydroxide is less than 80 mass % of the total active material mixture, there is a tendency for the capacity of the battery to become smaller. For the conductivity-assist agent, graphite, cobalt, cobalt compound or the like is conveniently adaptable. Particularly in the case where spherical nickel hydroxide coated with cobalt oxide is employed as the active material, reduction of the discharging capacity can be suppressed even if the amount of nickel for the current collector is reduced. Further, carboxymethylcellulose, and the like can be cited as the binder.

The electrode for a battery of the present invention may be produced by pressure forming of the electrode substrate. Since the thickness of the electrode substrate in the filling step of the electrode substrate with an active material mixture is greater than the thickness of the electrode in a battery product, the electrode (electrode substrate) can carry more active material than in the case where pressure forming was not effected.

The thickness of the electrode produced by pressure forming of the electrode substrate is to be selected appropriately depending upon the application of the battery. For a battery destined for high power use as in hybrid vehicles, electric tools and the like, the thickness of the nickel electrode employed is approximately 350 μm to 500 μm. For a battery destined for high capacity use as in digital cameras and the like, the thickness of the nickel electrode employed is approximately 550 μm to 800 μm.

Example 1

Example 1 corresponds to an electrode substrate having a nonwoven base coated with nickel. A plurality of electrodes were produced with different thickness of the electrode substrate and different compression ratio on the electrode substrate. The active material introduced into the electrode substrate was an active cathode material for a nickel-hydrogen battery. The produced electrode was an electrode destined for a nickel-hydrogen battery.

In the production of a nickel-hydrogen battery, first five nonwoven fabrics were prepared, having the average pore size of 10, 20, 35, 50 and 65 μM This nonwoven fabric was formed of fibers in a sheath-core structure with the outer circumference of a polypropylene (PP) fiber coated with polyethylene (PE). For the nonwoven fabric, the mass ratio of polypropylene to polyethylene (PP/PE ratio) was 3/7, and the thickness was 0.9 mm. Additionally, two nonwoven fabrics (base) having the average pore size of 20 and 50 μm were prepared. For these two nonwoven fabrics, the mass ratio of polypropylene to polyethylene (PP/PE ratio) was 8/2, and the thickness was 0.9 mm.

The nonwoven fabrics of the present example were subjected to heat treatment for one minute at 120° C. to obtain a base having the fibers of the nonwoven fabric fusion-bonded together at cross points. Since the fibers of the nonwoven fabric are joined by fusion-bonding, the strength with respect to compression at a subsequent step on the electrode substrate, i.e. the relevant nonwoven fabric coated with nickel, can be achieved.

Figure 3:
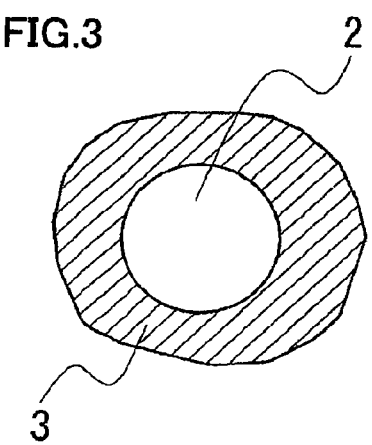
FIG. 3 is a sectional view of the base of the electrode substrate taken along line of FIG. 1.

The nonwoven fabric (electrode substrate) subjected to heat treatment was observed by an electronic microscope. FIG. 1 is a schematic diagram representing the fabric cross points of the base having the average pore size of 35 μm and PP/PE ratio of 3/7 among the prepared bases. Referring to FIG. 1, a base 1 of the electrode substrate is formed of mesh fibers including a core 2, and a coating 3 covering the outer circumference of core 2. These fibers are fusion-bonded at a cross point S. The cross section at cross point S in FIG. 1 (II-II cross section: refer to FIG. 2) was compared with a fiber cross section at a site other than at the cross point cross section: refer to FIG. 3). As used herein, the II-II cross section is a cross section that bisects the larger angle of the angles determining cross point S, and the cross section is a cross section orthogonal to the fiber axial direction. Comparison between the II-II cross section and cross section was conducted by obtaining the average value from measurements at 10 sites selected from different field of views for the II-II cross section and cross section through the microscope, and comparing the average values. Upon comparison between the II-II cross section of cross section, the ratio of the coating at the II-II cross section was 1.1 times larger than the ratio of the coating at the cross section. In other words, the cross sectional area of the II-II cross section where two fibers cross and meld was larger than the cross sectional area of two of the fiber cross section cross section).

Observation through a microscope was conducted in a similar manner for bases other than the base set forth above, and the degree of fusion-bonding was also evaluated. The degree of fusion-bonding was represented by the ratio of the coating at the II-II cross section to the ratio of the coating at the cross section. The results are shown in Table 1. In the present example, "pore size" was the value where the accumulated pore distribution is 30%, measured by the bubble point test.

TABLE 1

| Substrate | Pore Size (μm) | PP/PE Ratio | Degree of Fusion-bonding | Fiber (dtex) |
| --- | --- | --- | --- | --- |
| aa | 10 | 3/7 | 1.11 | 2.2 |
| bb | 20 | 3/7 | 1.09 | 2.2 |
| cc | 35 | 3/7 | 1.10 | 3.3 |
| dd | 50 | 3/7 | 1.09 | 3.3 |
| ee | 65 | 3/7 | 1.08 | 6.7 |
| ff | 20 | 8/2 | 1.01 | 2.2 |
| gg | 50 | 8/2 | 0.99 | 6.7 |

\* Degree of fusion-bonding . . . (Ac/A)/(Bc/B)
A: cross sectional area at II-II cross section at fiber cross point
Ac: cross sectional area of coating at II-II cross section
B: cross sectional area of III-III cross section of fiber other than at cross point
Bc: cross sectional area of coating at III-III cross section All the II-II cross sections of bases aa-ee set forth above took the fusion-bonded state as shown in FIG. 2. The cross sections of bases ff-gg indicated fusion-bonding only at the site where the fibers are in contact at the fiber cross point, and the ratio of the coating at the cross section was not increased.

A conductive layer was formed on the surface of each nonwoven fabric (bases aa-gg) through a well-known sputtering device to allow electrolytic plating. The sputtering process includes the steps of arranging an electrode substrate and a nickel piece in a vacuum container, applying high direct-current voltage while introducing inert gas, to form a nickel layer (coating) on the nonwoven fabric by collision of the ionized inert gas against the nickel piece. The amount of nickel applied as a coat on the nonwoven fabric by sputtering was 10 g/m$^2$.

The nonwoven fabric rendered conductive was plated with nickel. Nickel plating was conducted employing a Watt bath containing 330 g/L of nickel sulfate, 50 g/L of nickel chloride, and 40 g/L of boric acid as the main component. Specifically, the aforementioned conductive nonwoven fabric wound around a roll was placed in a Watt bath to have nickel plated such that the amount of nickel applied as a coat was 200 g/m$^2$ in average. As the counter electrode of the nonwoven fabric with conductivity, a titanium basket with a nickel piece therein was employed. The thickness of the nickel plated on the nonwoven fabric was approximately 8 µm, which is extremely thin. The thickness and pore size of the electrode substrate differ only slightly from the thickness and pore size of the base prior to the plating of nickel.

The bases aa-gg were filled with an active material paste (active material mixture) through press fitting (pressure: 300 Pa (ca. 3 g/cm$^2$). The employed active material paste was prepared by adding 0.8% carboxymethylcellulose aqueous solution into the mixture of 92 mass part of nickel hydroxide powder and 2 mass part of cobalt oxy oxide to obtain paste (24 mass percent of moisture). The surface of the nickel hydroxide powder was coated with cobalt oxyhydroxide corresponding to 3% in mass ratio by a well known method.

Immediately after the filling of bases aa-gg with the active material paste set forth above, the surface of the electrode substrate was smoothened, and then dried at 90° C. After drying, a roller press machine having an embossed roller of 30 cm in diameter was employed to compress (pressure forming) the electrode substrate carrying the active material such that the thickness becomes 450 µm. Thus, nickel electrodes a-g were produced.

Each of nickel electrodes a-g were cut into strips of 34 mm in width and 270 mm in length as cathodes. Batteries A-G were produced employing such cathodes. Specifically, the overlapping layers of a cathode, a separator, and an anode were wrapped in a roll, placed in a SubC-size battery jar (cylindrical container: φ23 mm×43 mm) into which electrolyte was poured to produce a battery. In the wrapping of the cathode and the anode, they were deviated in position in the longitudinal direction of the battery jar. The longer side end of the cathode strip was multipoint welded to the disk current collector located at the upper region of the battery jar, and the longer side end of the strip anode was multipoint welded to the disk current collector located at the lower region of the battery jar, based on the so-called tables type.

For the anode in batteries A-G, the well-known hydrogen-storing alloy was employed. The anode was produced by applying a paste of hydrogen-storing alloy on punched metal obtained by applying nickel plating on iron. The surface was smoothed, and subjected to pressure forming by a roller press. The hydrogen-storing alloy paste was obtained by adding five-element hydrogen-storing alloy of the MmNi type including Al, Mn and Co (Mm is rare earth mixture with Ce, La, Pr and Nd as the main component) into 1% carboxymethylcellulose aqueous solution. The dimension of the anode is 34 mm in width, 270 mm in length, and 380 µm in thickness. The N/P which is the capacity of the anode to the capacity of the cathode was 1.5. The reason why the capacity of the anode is set larger than the capacity of the cathode is to adsorb the gaseous oxygen generated in the battery by the anode at the time of excessive charging.

For the separator, a nonwoven fabric of polypropylene, having affinity with the electrolyte being subjected to hydrophilization treatment was employed. The separator had a thickness of 140 µm, a width of 34 mm, and a length of 270 mm. The electrolyte was obtained by dissolving lithium hydroxide in 30% potassium hydroxide aqueous solution to become 30 g/L.

Table 2 represents the capacity (mAh) and capacitance density (mAh/cc) with batteries based on nickel electrodes a-g. In addition, the pore size (µm), the PP/PE ratio of the nonwoven fabric, and the degree of fusion-bonding at the fiber cross point of electrode substrates aa-gg employed for nickel electrodes a-g are also indicated.

TABLE 2

| Electrode | Pore Size (µm) | PP/PE Ratio | Degree of Fusion-bonding | Capacity (mAh) | Capacity Density (mAh/cc) |
|---|---|---|---|---|---|
| a | 10 | 3/7 | 1.11 | Filling not Allowed | — |
| b | 20 | 3/7 | 1.09 | 2300 | 500 |
| c | 35 | 3/7 | 1.10 | 2300 | 500 |
| d | 50 | 3/7 | 1.09 | 2300 | 500 |
| e | 65 | 3/7 | 1.08 | 2300 | 500 |
| f | 20 | 8/2 | 1.01 | 2300 | 500 |
| g | 50 | 8/2 | 0.99 | 2300 | 500 |

As indicated in Table 2, electrode substrate aa (electrode a) could not be filled with active material paste. Therefore, a corresponding battery could not be obtained. This because the pore size of electrode substrate aa is too small. The remaining electrodes b-g allowed filling of the active material paste. Batteries B-G having the same capacity and capacitance density could be produced.

Then, the high rate discharge property of the produced batteries B-G at ambient temperature was identified. The high rate discharge property was evaluated by measuring the average discharge voltage when discharging at 1 C and 10 C after charging at the charging/discharging electric coefficient of 1 C under the environment of 25° C. The results are shown in Table 3.

TABLE 3

| Battery | Pore Size (µm) | PP/PE | Degree of Fusion-bonding | Average discharge voltage at 1 C (V) | Average discharge voltage at 10 C (V) |
|---|---|---|---|---|---|
| B | 20 | 3/7 | 1.09 | 1.25 | 1.05 |
| C | 35 | 3/7 | 1.10 | 1.24 | 1.04 |
| D | 50 | 3/7 | 1.09 | 1.24 | 1.00 |
| E | 65 | 3/7 | 1.08 | 1.24 | 0.92 |
| F | 20 | 8/2 | 1.01 | 1.24 | 1.04 |
| G | 50 | 8/2 | 0.99 | 1.24 | 1.00 |

It is appreciated from the results in Table 3 that there is no significant difference even if the pore size varies in the average discharge voltage at 1 C that is a low-rate discharge in the batteries. However, it was identified that the average discharge voltage becomes higher for a battery with a smaller pore size for the electrode substrate when the average discharge voltage is 10 C, which is a high-rate discharge. The average discharge voltage of the battery employing an electrode substrate having the largest pore size of 65 µm was extremely lower than that of batteries employing an electrode substrate of other pore sizes. In other words, it became apparent that a battery of high power can be obtained by employing an electric substrate of smaller pore size. This is probably due to the fact that the reaction rate between the active material particles and the current collector frame (electrode substrate) is improved because of the shorter distance therebetween in accordance with the small pore size.

The capacity maintaining rate of each battery in accordance with the charging and discharging cycle under an environment of high temperature (45° C.) was examined based on batteries B-G The capacity maintaining rate is the ratio of the capacity at an arbitrary cycle to the capacity of the first cycle. In the present example, the capacity maintaining rate of the 500th cycle was examined for the batteries. The results are shown in Table 4.

TABLE 4

| Battery | Pore Size (μm) | PP/PE Ratio | Degree of Fusion-bonding | Capacity Maintaining Rate After 500 Cycles (%) |
|---|---|---|---|---|
| B | 20 | 3/7 | 1.09 | 88 |
| C | 35 | 3/7 | 1.10 | 85 |
| D | 50 | 3/7 | 1.09 | 83 |
| E | 65 | 3/7 | 1.08 | 59 |
| F | 20 | 8/2 | 1.01 | 72 |
| G | 50 | 8/2 | 0.99 | 65 |

As shown in Table 4, the capacity maintaining rate of batteries B-D (pore size 20-50 μm) was higher than 80%, whereas the capacity maintaining rate of battery E (pore size 65 μm) was less than 60%. The capacity maintaining rate was higher in proportion to a smaller pore size. This is probably due to the fact that the active material is not readily detached from the current collector by virtue of the small pore size, and that the distance between the current collector and the active material is small even if detachment occurs.

Upon comparison between batteries B and F, and between batteries D and G, the battery with a higher PP/PE value had a lower capacity maintaining rate. This is probably due to the fact that, since the PP ratio of the nonwoven fabric is high, i.e. the PE ratio is low, the fusion-bonding between the fibers at the cross point through heat treatment is weak and expansion of the electrode in accordance with charging and discharging readily occurs to cause detachment of the active material.

In accordance with the electrode substrate for a battery of the present invention, there can be fabricated an electrode for a battery, having a capacity maintaining rate less likely to be reduced even by repetitive charging and discharging, and superior in high rate discharge property.

By employing the electrode for a battery with the electrode substrate of the present invention, there can be fabricated a battery, having a capacity maintaining rate less likely to be reduced even by repetitive charging and discharging, and superior in high rate discharge property.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A fabrication method of an electrode substrate for a battery, having nickel applied as a coating on a surface of a base constituted of crossing of a plurality of fibers including a core formed of synthetic resin and a coating formed of synthetic resin having a softening temperature lower than the softening temperature of the synthetic resin forming the core, said fabrication method comprising the steps of:
    fusion-bonding the fibers at a cross point by heat treatment,
    applying a coating of nickel to the fibers subjected to said heat treatment, and compressing said electrode substrate,
    said core formed of polypropylene and said coating formed of polyethylene,
    said heat treatment being carried out under conditions of 5 seconds to 3 minutes at 95° C. to 140° C. such that, at the fibers subjected to said heat treatment, an average value of a ratio of a coating occupying a cross section (a) at n cross points of fibers selected arbitrarily and an average value of a ratio of a coating occupying a cross section (b) of m fibers at a site other than at the cross points selected arbitrarily satisfy an equation of:

$$\left[\sum_{i=1}^{n}(Ac/A)\right]/n > \left[\sum_{j=1}^{m}(Bc/B)\right]/m$$

where n, m: natural number to obtain the average value of the ratio of the coating occupying the cross section, n≧3, m≧3,
i, j: natural number, i≧1, j≧1,
A: cross sectional area of cross section (a) at cross point,
Ac: cross sectional area of coating at cross section (a),
B: cross sectional area of cross section (b) of fiber other than at cross points,
Bc: cross sectional area of coating at cross section (b), and
the cross section (a) at the cross point is the cross section bisecting a larger angle of angles at a cross point defined by fibers, wherein
said electrode substrate for a battery has a pore size of 20 to 50 μm,
a ratio of a mass of polypropylene to a mass of polyethylene in said fiber is 2/8 to 7/3,
said electrode substrate satisfies an equation of $$1.09 < \frac{\left[\sum_{i=1}^{10}(Ac/A)\right]/10}{\left[\sum_{j=1}^{10}(Bc/B)\right]/10} < 2.0, \text{ where } \frac{\left[\sum_{i=1}^{10}(Ac/A)\right]/10}{\left[\sum_{j=1}^{10}(Bc/B)\right]/10}$$

represents a degree of fusion-bonding, and
a thickness of the compressed electrode substrate is 350 μm to 500 μm.

2. The fabrication method of an electrode substrate for a battery according to claim 1, wherein an amount of said nickel is 150 g/m² to 300 g/m².

3. A fabrication method of an electrode for a battery, wherein an active material mixture containing nickel hydroxide is carried in the electrode substrate for a battery defined in claim 1.

4. A fabrication method of an alkaline battery employing the electrode for a battery defined in claim 3 as a positive electrode.

5. The fabrication method of an electrode substrate for a battery according to claim 1, wherein
    said ratio of mass of polypropylene to a mass of polyethylene in said fiber is 3/7,
    said electrode substrate satisfies the equation of $$1.09 \leq \frac{\left[\sum_{i=1}^{10}(Ac/A)\right]/10}{\left[\sum_{j=1}^{10}(Bc/B)\right]/10} \leq 1.10,$$

and
said thickness of the compressed electrode substrate is 450 μm.

* * * * *